US012438886B2

(12) United States Patent
Kern et al.

(10) Patent No.: US 12,438,886 B2
(45) Date of Patent: Oct. 7, 2025

(54) PREVENTING UNREGISTERED ELECTRONIC DEVICES FROM ACCESSING A SECURE AREA

(71) Applicant: Lenovo Enterprise Solutions (Singapore) Pte Ltd., Singapore (SG)

(72) Inventors: Eric R Kern, Chapel Hill, NC (US); Paola Martinez Morales, Wendell, NC (US); Drew Johnson, Fuquay-Varina, NC (US); Christopher Scullion, Lawrenceville, GA (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 150 days.

(21) Appl. No.: 18/478,754

(22) Filed: Sep. 29, 2023

(65) Prior Publication Data

US 2025/0112931 A1 Apr. 3, 2025

(51) Int. Cl.
*G06F 21/00* (2013.01)
*H04L 9/40* (2022.01)

(52) U.S. Cl.
CPC .......... *H04L 63/107* (2013.01); *H04L 63/083* (2013.01); *H04L 63/0876* (2013.01)

(58) Field of Classification Search
CPC .. H04L 63/107; H04L 63/083; H04L 63/0876
See application file for complete search history.

(56) References Cited

U.S. PATENT DOCUMENTS

| 10,757,672 | B1* | 8/2020 | Knas | H04W 40/244 |
| 11,140,157 | B1* | 10/2021 | Xia | H04L 63/0853 |
| 11,144,627 | B2* | 10/2021 | Kumar | H04W 4/02 |
| 2016/0142443 | A1* | 5/2016 | Ting | H04L 63/20 726/1 |
| 2019/0156064 | A1* | 5/2019 | Hansen | H04L 63/00 |
| 2020/0120088 | A1* | 4/2020 | Jain | G06F 21/32 |
| 2020/0334345 | A1* | 10/2020 | Young | G06F 21/32 |

* cited by examiner

*Primary Examiner* — Kendall Dolly
(74) *Attorney, Agent, or Firm* — Jeffrey L. Streets

(57) ABSTRACT

A computer program product and a method may include various operations. The operations include receiving, from one or more computing devices, user data identifying a user of the computing device, user device data identifying the computing device, a current location of the computing device, and identification of electronic devices transmitting a wireless signal detected by the computing device. Access into a secure area is enabled responsive to determining that, for each computing device, a set of conditions are satisfied. The conditions include: the user data authenticates the user with reference to user records in an authorized user data structure; the user device data identifies a device registered to the user; the received current location of the computing device is nearby to the secure area; and for each detected electronic device, the electronic device is registered to an authorized user that has been authenticated and is present nearby the entrance.

20 Claims, 7 Drawing Sheets

PREVENTING UNREGISTERED ELECTRONIC DEVICES FROM ACCESSING A SECURE AREA

BACKGROUND

The present disclosure relates to systems and methods for authenticating one or more authorized personnel before allowing them to enter a secure area, such as a data center.

BACKGROUND OF THE RELATED ART

A secure area may be walled off and have a limited number of entry points. Each entry point may have a system that requires an authorized person to authenticate themselves to gain entry through a door into the secure area. However, a security breach can occur when an unauthorized person, with or without consent of the authorized person, follows the authorized person through the door into the secure area. If the unauthorized person does not have the consent of the authorized person, then the action of the unauthorized person is referred to as "tailgating." If the unauthorized person does have the consent of the authorized person, then the action of the unauthorized person is referred to as "piggybacking."

In one scenario, the unauthorized person may breach security by simply following the authorized person to give the appearance of being legitimately escorted into the secure area. In another scenario, the unauthorized person may join a large crowd of authorized persons and pretend to be a member of the crowd that is allowed to enter the secure area. Still further, the unauthorized person may find an authorized person that is not being diligent about following the rules of the secure area, where the authorized person agrees to allow the unauthorized person to enter the secure area with them.

BRIEF SUMMARY

One embodiment provides a computer program product comprising a non-volatile computer readable medium and non-transitory program instructions embodied therein, the program instructions being configured to be executable by a processor to cause the processor to perform various operations. The operations comprise receiving, from one or more personal computing devices, user data identifying a user of the personal computing device, user device data uniquely identifying the personal computing device, a current location of the personal computing device, and an identification of one or more electronic devices transmitting a wireless signal detected by the personal computing device. The operations further comprise enabling access through an entrance into a secure area in response to determining that, for each of the one or more personal computing devices, a set of conditions are satisfied. The set of conditions include: the received user data identifying the user of the personal computing device matches data in a user data field of one of a plurality of user records stored in an authorized user data structure; the received user device data uniquely identifying the personal computing device matches data stored in a user device field of the same user record as the received user data; the received current location of the personal computing device is within a predetermined area near the entrance into the secure area; and for each of the one or more electronic devices detected by the personal computing device, the identification of the electronic device matches data in a user device field of one of the plurality of user records stored in the authorized user data structure and the same user record that includes the identification of the electronic device identifies a user that has been authenticated and determined to have a current location within the predetermined area.

Some embodiments from a computer program product comprising a non-volatile computer readable medium and non-transitory program instructions embodied therein, the program instructions being configured to be executable by a processor of a personal computing device to cause the processor to perform operations. The operations comprise receiving user input including information identifying the user of the personal computing device, obtaining a current location of the personal computing device using an integrated location detection system, and detecting wireless signals being transmitted by electronic devices that are present within an area immediately adjacent to the personal computing device. Still further, the operations comprise submitting data to a security system that controls access through an entrance into a secure area, wherein the data submitted to the security system includes the identifying information about the authorized person, the current location of the personal computing device, and an indication of a number of the other electronic devices that are detected.

DETAILED DESCRIPTION

Figure 1:
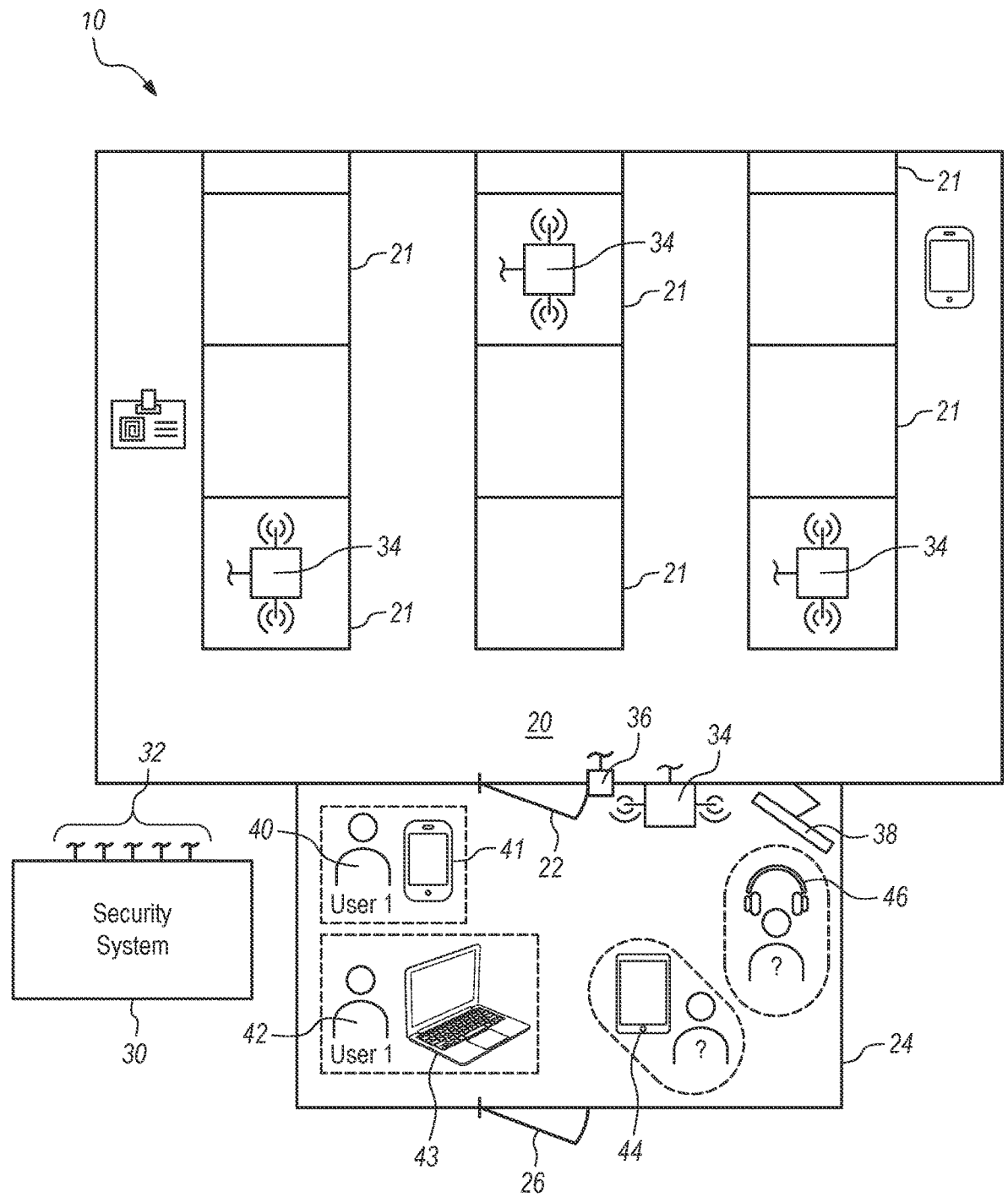
FIG. 1 is a diagram of a system for controlling physical access to a secure area.

One embodiment provides a computer program product comprising a non-volatile computer readable medium and non-transitory program instructions embodied therein, the program instructions being configured to be executable by a processor to cause the processor to perform various operations. The operations comprise receiving, from one or more personal computing devices, user data identifying a user of the personal computing device, user device data uniquely identifying the personal computing device, a current location of the personal computing device, and an identification of one or more electronic devices transmitting a wireless signal detected by the personal computing device. The operations further comprise enabling access through an entrance into a secure area in response to determining that, for each of the one or more personal computing devices, a set of conditions are satisfied. The set of conditions include: the received user data identifying the user of the personal computing device matches data in a user data field of one of a plurality of user records stored in an authorized user data structure; the received user device data uniquely identifying the personal computing device matches data stored in a user device field of the same user record as the received user data; the received current location of the personal computing device is within a predetermined area near the entrance into the secure area; and, for each of the one or more electronic devices detected by the personal computing device, the identification of the electronic device matches data in a user device field of one of the plurality of user records stored in the authorized user data structure and the same user record that includes the identification of the electronic device identifies a user that has been authenticated and determined to have a current location within the predetermined area.

The processor may be included in a security system computer that controls access to the secure area. Specifically, the security system may control the entrance into the secure area by locking and unlocking a door that opens to the secure area. Enabling access to the secure area may include unlocking the door and disabling access to the secure area may include locking the door. For example, the security system may control an electromagnetic lock or an electronic actuator that can control movement of a deadbolt. The security system may also include one or more transceivers for wireless communication with the personal computing devices both at the entrance to the secure area and within the secure area and for detecting and tracking of other electronic devices.

In some embodiments, each user may be required, as a precondition to being able to initiate their own authentication, to install a security application program on at least one of their personal computing devices, such as their smartphone or mobile computing device, and may be further required to register all of the electronic devices that they are going to bring into the secure area, such as a datacenter. To "register" an electronic device, a user must provide the security system with uniquely identifying attributes of the electronic device, such as a MAC address. The security system may store this information in the authorized user data structure so that the information that uniquely identifies the electronic device will be associated with the authorized user that owns and registers the electronic device. Typically, the personal computing device and/or certain electronic devices may be "associated" with the user by virtue of the device's identifying information being stored as fields in the same record of the data structure or otherwise linked to the same record of the data structure.

In some embodiments, the personal computing device may be a mobile computing device, such as a smartphone, laptop computer or tablet computer. The personal computing device preferably has a wireless communication transceiver integrated into the device to facilitate communication with the security system. Accordingly, the security system may receive the user data, user device data, current location and identification of one or more electronic devices via wireless communication. Optionally, the wireless communication may use a cellular communication protocol, a wireless network communication protocol, a short-range communication protocol, or a near-field communication protocol.

In some embodiments, the user data identifying the user of the personal computing device may include, without limitation, a personal name, security system username and/or password, badge number or RFID code, personal identification number, and/or biometric data. The user data may be unique and/or private or secret to the user, such that submission of the user data serves to authenticate the user to the security system.

In some embodiments, the user may become an authorized user when, for example, a system administrator registers the person into an authorized user database of a security system as being authorized. For example, an individual user record in the authorized user database may include the user's name, system username, badge number or RFID code, password, biometric data, electronic devices and the like. When an authorized user subsequently requests access to a secure area where access is controlled by the security system, the authorized user must provide sufficient credentials to meet a predetermined authentication requirement before the security system will grant them access to the secure area. For example, if the predetermined authentication requirement of the security system requires an authorized user to provide two forms of identification, then the authorized user must provide the two forms of identification that match the entries in their individual user record.

In some embodiments, the user device data may uniquely identify the personal computing device. In a preferred example, the user device data may be a media access control (MAC) address. A MAC is a unique identifier assigned to a network interface controller (NIC) for use as a network address in communication within a network, whether the network is using Ethernet wired computer networking technology, Wi-Fi™ wireless network technology, or Bluetooth® short-range wireless technology.

In some embodiments, the security system may send output to the personal computing device prompting the user of the personal computing device to enter one or more types of the user data identifying the user. The requested user data could be the same each time, such as a username and password, or the requested user data may be randomly selected or changed from time to time from among the user data that has been stored in the user record of the authorized user data structure.

In some embodiments, the current location of the personal computing device may be determined using a global positioning system (GPS). GPS is a satellite-based radio navigation system that provides geolocation and time information to a GPS receiver. Accordingly, a personal computing device with a built-in GPS receiver may receive signals from multiple satellites and use those signals to compute its current location, which may be output as latitude and longitude. However, the current location of the personal computing device may be determined using an indoor positioning system (IPS). An IPS is a network of devices, such as Wi-Fi antennas, Bluetooth antennas, relays or beacons, that have been strategically placed through a defined area. The personal computing device may then use, for example, a Time of Arrival (ToA) determination, Angle of Arrival (AOA) determination and/or Received Signal Strength Indication (RSSI) along with known positions of the signal sources in order to determine location.

In some embodiments, the security or authentication system may require that an authorized user share their current location to prove physical presence at the entry point to the secure area by downloading an application program onto a personal computing device, such as a smartphone, tablet or laptop computer belonging to the authorized user. The application program may use one or more systems of the personal computing device to report the authorized user's location to the security system. For example, the application program may access the GPS system of the personal computing device and submit the current GPS coordinates of the device to the security system, or the personal computing device may use a wireless system, such as Bluetooth or WiFi, to interface with the security system. Optionally, the application program may prompt the authorized user to share or send the current location of the personal computing device and the user after the personal computing device has been unlocked by some amount of user authentication to the personal computing device. Alternatively, the application program may automatically share or send the current location of the personal computing device and the user after the personal computing device has been unlocked by some amount of user authentication to the personal computing device.

In some embodiments, the current location of the user may be a predetermined authentication requirement used to authenticate the user. In other words, the security system must verify that the authorized user is currently located at the data center or other secure area into which access is being attempted. Requiring the authorized user to show physical presence (current location) at the datacenter or other secure area prevents an unauthorized person from using the authorized user's credentials to gain access to the secure area, such as by obtaining the security badge and password/PIN of the authorized user. The security badge and password/PIN may still be required, but the current location of the authorized user may be a second or third level of authentication combined with the security badge, passcode/PIN, and/or other identifying information.

In some embodiments, the identification of each of the one or more electronic devices may include a media access control (MAC) address. A MAC address is a unique identifier of a network interface controller for an electronic device and makes it possible to distinguish the wireless signals from one electronic device from the wireless signals of another electronic device. Upon receiving the identification of an electronic device, such as the device's MAC address, the security system may look for the MAC address in the authorized user data structure. If the MAC address is found in the authorized user data structure (i.e., the electronic device is registered with the security system), then the security system may further inspect the user record where the MAC address was found to identify the authorized user to whom the electronic device is registered. In some embodiments, if the identified authorized user has been authenticated and is present near the entrance to the secure area, then the presence of the electronic device registered to the authorized user is presumed to be in the possession of the authorized user and is deemed to not be evidence of a tailgating person or device. If the electronic device is unknown to the security system (i.e., the electronic device is "unregistered"; has a MAC address that is not stored in any of the user records of the authorized user data structure), then access to the secure area may be denied until the electronic device becomes registered to an authorized user or the electronic device is removed from the proximity of the entrance into the secure area. Nonlimiting examples of electronic devices that would require registration include a smartphone, tablet or laptop computer, and Bluetooth headset. However, even more obscure electronic devices may require registration, such as a continuous glucose monitor (which includes circuitry for wireless communication of glucose levels) that is worn by an individual user.

The security system may associate a variety of electronic devices with an individual user. For example, the security system may include a database that stores device ownership records. Optionally, the authorized users and devices database may include a record for each authorized user, wherein the record for an individual user includes identifying information for the user and identifying information for each of the user's electronic devices. For example, information that may uniquely identify an electronic device may include a Media Access Control (MAC) address. While some embodiments may require an individual user to have at least one electronic device, such as their personal computing device, associated or registered with the individual user in the database, there is no particular limit to the number of devices that may be associated with the individual user. For example, an individual user may have a smartphone, notebook computer, Bluetooth headset, smart watch, and other wireless-enabled devices. Any or all of these devices may be registered in the database in association with the user and the user may bring any or all of these devices with them into the secure area. However, embodiments may detect each of these devices present in proximity of the entrance and verify that each of these devices are registered to the authorized user that is engaged in the authentication process as a condition of granting access to the secure area.

In some embodiments, the security system may generate a graphical user interface providing information about the status of the process and conditions for gaining access to the secure area. The graphical user interface may be directed to the one or more personal computing devices that are currently interacting with the security system at the entrance to the secure area and/or may be directed to a display screen positioned near the entrance to the secure area. Accordingly, the status information may include the number of users that have passed authentication, the number of unregistered electronic devices that have been detected in proximity to the entrance, and any other information that may assist authorized users to satisfy the set of conditions necessary for the security system to enable access to the secure area. For example, even if a single authorized user is present at the entrance and has authenticated themselves to the security system, they may be denied access due to possessing an unregistered device, such as a wireless headset or smartwatch. Such authorized user may be subsequently granted access after registering the unregistered device or placing it beyond the proximity of the entrance. However, the status information provided in the graphical user interface may assist the authorized user(s) to troubleshoot the conditions that are causing access to be denied and take action to remedy the conditions so that access may be granted.

In some embodiments, the operations may further comprise receiving, from one or more of the personal computing devices, an updated identification of one or more electronic devices transmitting a wireless signal detected by the personal computing device. The people and electronic devices within the area or predetermined proximity near the entrance to the secure area may be dynamically changing. Accordingly, the personal computing device of the user present in the area may provide the security system with updates identifying the current electronic devices that are also present in the area. In one example, there may be a first set of electronic devices detected and reported to the security system at the time that the user has initiated the authentication process using their personal computing device, yet before the authentication process has been completed the personal computing device detects a signal from another electronic device. While the set of conditions for accessing the secure area may have been satisfactory up to that point, the presence of the additional electronic device may result in one or more of the required conditions being unmet such that access will be denied. In another example, there may be a first set of electronic devices detected and reported to the security system at the time that the user has initiated the authentication process using their personal computing device, yet before the authentication process has been completed the personal computing device detects that one of the electronic devices can no longer be detected. While the set of conditions for accessing the secure area may have been unsatisfactory up to that point, the absence of the one electronic device may result in satisfying the required conditions such that access will be granted. Accordingly, it is important to receive updated identification of the electronic devices detected by the personal computing device. The updates may be continuous, periodic or in response to a change in the electronic devices present, but the detected electronic devices should at least be provided at the beginning of the authentication process and as a near final step in the authentication process to verify that the electronic devices and/or people present near the entrance has not suddenly changed. A tailgating person or device is most likely to enter the area near the entrance at the last instant in an attempt to enter the secure area without going through the authentication process.

In some embodiments, the operations of the security system computer may include sending output to the personal computing device prompting the user to direct a camera of the personal computing device to capture images of the predetermined area near the entrance into the secure area. After the user has complied with the prompt, the security system may receive the captured images from the personal computing device and analyze the captured images to determine a number of people that are currently present in the predetermined area near the entrance into the secure area. Optionally, the security system may determine the identity of as many of the people as possible, perhaps due to having a facial image stored in the authorized user data structure in association with some of the user records. However, even just using the captured image(s) to determine a number of people present will enable the security system to determine whether or not the number of people currently present in the predetermined area is equal to the number of people that have been authenticated and determined to have a current location within the predetermined area. If the captured images indicate that there is another person in the predetermined area in the proximity of the entrance, access to the secure area may be denied for anyone, including those who have been fully authenticated, are present, and all of their own electronic devices have been registered. The additional person represents a risk that the person will tailgate the authorized user(s) into the secure area. Accordingly, the additional person must leave the predetermined area, become an authorized user by registering with the security system and creating a user record in the authorized user data structure, or be accepted as a guest and provided with a guest device that will accompany the guest into the secure area to allow tracking of the guest. The guest device may be a device dedicated to enabling guests into the secure area or the guest may download an app onto their own personal computing device to make their personal computing device perform as a guest device by allowing guest tracking throughout the secure area.

In some embodiments, a group of authorized users in proximity to the entrance may go through the authentication process together and may either be granted or denied access to the secure area as a group. To perform the group authorization/authentication, the application program on the personal computing devices of each user in the group must communicate wirelessly with a security system that controls the entrance (i.e., door) to the secure area (i.e., datacenter) and each user must authenticate themselves to the security system. If any of the users in the group are not authenticated, then the authentication of the entire group may fail and access to the secure area may be denied. However, if all of the users in the group are authenticated, then the entire group may be authenticated and granted access to the secure area.

In some embodiments, the operations may further include registering a person as an authorized user with privilege to access a secure area by creating a user record in the authorized user data structure with user data identifying the person and user device data identify a personal computing device belonging to the person. Additional data, values and fields may be included in the user record to facilitate the embodiments described herein. For example, a username and password may be stored in separate fields and may be sufficient user data for some embodiments, while other embodiments may include biometric data, personal identification numbers or codes, RFID security badges, specific gestures, and the like. Furthermore, the user record may accommodate the registration of any number of user devices, a user security level, user phone number, and the like. Still further, the user record may include or link to a history of user access to the secure area.

In some embodiments, the operations of the security system computer may include enforcing the set of conditions for enabling access to the secure area, where the set of conditions further includes the user record in the authorized user data structure associated with the user of the personal computing device having a security level field indicating that the user has privilege to access the secure area. This condition may be enforced in addition to any or all other disclosed conditions. Accordingly, under the conditions that an authorized user has been authenticated, is present at the entrance, has all of their electronic devices registered, and there is no unregistered device or person present at the entrance, the authorized user might still be denied access to the secure area if that authorized user's user record includes a value in the security level field indicating that the authorized user's privileges are insufficient to gain access to this particular secure area. Each secure area or zone may have a predetermined security level and the value in the security level field of a user record that be compared to the predetermined security level for the secure area in order to determine whether the user has sufficient privileges (i.e., a sufficient security level) to be granted access to the secure area. Optionally, the authorized user may indicate their request to access a particular secure area by initiating the authentication process and being present near an entrance to the particular secure area.

Some embodiments may be applicable even after the user has already gained access to the secure area. For example, the security system may monitor and track the user's location within the secure area. In one embodiment, the operations may further comprise obtaining a current location of each user within the secure area, determining whether each user has privilege to access a particular server within the secure area, and enabling keyboard, mouse, and/or video access to the particular server in response to determining that each user that has a current location within a predetermined proximity of the particular server has privilege to access the particular server. In one option, the operations may include disabling the keyboard, mouse and/or video access to the particular server in response to determining that there is no user that is within a predetermined proximity of the particular server having privilege to access the particular server. In other words, the default condition of keyboard, mouse and/or video access to the server may be a locked condition. In another option, the operations may include disabling the keyboard, mouse and/or video access to any server within a predetermined proximity of the user in response to determining that the user does not have privilege to access the particular server. In other words, the default condition of the of keyboard, mouse and/or video access to the server may be an unlocked condition, but the security system may lock access to the server in the presence of a user that does not have privileges to access the server. The user's privileges for server access may be the previously described security level stored in the authorized user's user record or may be a separately designated security parameter stored in a separate server security level field. Accordingly, a user record may designate one security level for the purpose of accessing secure areas and designate a second security level/parameter for the purpose of accessing servers or other IT equipment within the secure areas. For example, a user might have privileges to access a wide range of secure areas, but only have privileges to work on a certain scope of server on which they are certified or that are assigned to their responsibility. In another example, a user might have privileges to access only a single secure area but may have privileges to work on any IT equipment within that single secure area.

In some embodiments, the security system may recognize a specific wireless trackable device as a guest pass to be carried by a guest (i.e., a person that is not an authorized person) to access the secure area, such as on a temporary or one-time basis. The presence of the guest and wireless trackable device in the predetermined area near the entrance may be disregarded when determining that, for each of the one or more personal computing devices, the set of conditions are satisfied. For example, the guest may download the security application program onto their personal computing device and enable the application program to access the device location for sharing with the security system. Alternatively, the guest may be given a guest badge, bracelet, dongle or device with another form factor that enables location tracking within the datacenter or secure area. Optionally, the device given to the guest may include a radio frequency identification (RFID) tag. The operations of the security system may further include tracking a current location of the specific wireless trackable device within the secure area until the specific wireless trackable device is no longer within the secure area, wherein the current location of the guest is determined using an array of personal area network signal receivers and/or local area network signal receivers within the secure area to identify the current location of the wireless trackable device. An alert may be generated in response to the specific wireless trackable device entering a restricted area within the secure area or attempting some other action that is prohibited.

In some embodiments, the operations may further comprise tracking the path of each personal computing device and each electronic device within the secure area, wherein the current location of each personal computing device is received from the personal computing device until the personal computing device is no longer within the secure area. For example, the personal computing device may determine its current location by receiving signals from a Global Positioning System or an indoor location tracking/positioning system. Optionally, the tracking may include the use of cameras positioned within the secure area and connected to the security system. The operations may then identify, for each personal computing device and each electronic device within the secure area, a user record associated with the respective device and a security level associated with the user identified in the user record. Accordingly, the security system may generate an alert in response to determining, for any personal computing device or any electronic device, that the respective device is currently located within a restricted area within the secure area and the user record associated with the respective device identifies the user to have a security level that is not associated with privilege to access the restricted area.

In some embodiments, the operations further comprise monitoring wireless signal transmissions within the secure area and generating an alert in response to detecting a wireless signal transmission within the secure area that is not associated with any user device in the authorized user data structure. This may occur where a person has carried an unregistered electronic device into the secure area, then the unregistered electronic device is powered on after entering the secure area. The electronic device was not previously detectable in the predetermined proximity of the entrance to the secure area since the electronic device was not powered on and therefore not transmitting any signals. However, as soon as the electronic device transmits a signal, such as a Bluetooth or WiFi signal, wireless antennas fixed within the secure area or on the personal computing device may detect the signal transmission and provide that information to the security system.

In some embodiments, the security system may identify and flag any unusual activity within the secure area, such as a user entering an area that the user does not normally access and/or that the user does not have access privilege or credentials. Optionally, the security system may recognize various security zones within the secure area and store, in each authorized user's database record, the identity of one or more of the security zones that the authorized user is permitted to access. Alternatively, each security zone may be associated with one of a plurality of security levels and each authorized user's database record will identify the security level granted to the authorized user. Accordingly, an authorized user that has been assigned a given security level may be permitted to access any of the security zones that are associated with the given security level or any security level below the given security level.

In some embodiments, the security system may take action in response to the alert or the condition that led to the alert. For example, the security system may lockdown certain servers or other equipment in response to the alert. In one option, one or more systems nearby to the location where an unregistered/unauthorized device was detected may be locked out. For example, if an unauthorized device is detected at a given location within the datacenter, then computing systems and other equipment within a predetermined distance from, or predetermined area around, the location may be locked out. One example of a predetermined distance may be about 3-7 feet. Optionally, a computing system may be locked out by disabling a keyboard, video, and mouse (KVM) console that would otherwise be used to access the nearby systems. In a further option, one or more doors to the secure area or a security zone with the secure area may be locked.

Some embodiments provide a computer program product comprising a non-volatile computer readable medium and non-transitory program instructions embodied therein, the program instructions being configured to be executable by a processor of a personal computing device to cause the processor to perform operations. The operations comprise receiving user input including information identifying the user of the personal computing device, obtaining a current location of the personal computing device using an integrated location detection system, and detecting wireless signals being transmitted by electronic devices that are present within an area immediately adjacent to the personal computing device. Still further, the operations comprise submitting data to a security system that controls access through an entrance into a secure area, wherein the data submitted to the security system includes the identifying information about the authorized person, the current location of the personal computing device, and an indication of a number of the other electronic devices that are detected. Optionally, the integrated location detection system may be a global positioning system receiver.

In some embodiments, the personal computing device may scan for wireless signals that would indicate the nearby presence of one or more electronic devices. For example, the wireless signals may include Wi-Fi, Bluetooth, NFC, and/or other wireless technology signals. Furthermore, the personal computing device may continue scanning for the wireless signals of nearby electronic devices until access to the secure area has been either granted or denied. The scanning operation preferably determines whether the wireless signals are being transmitted by a device within a predetermined proximity of the entrance to the secure area, such as within 10 feet, or within a containment or waiting area associated with the entrance. The presence of any such electronic devices may indicate the presence of individuals that are unauthorized to enter the secure area and that pose a threat of tailgating the authorized user into the secure area. In some embodiments, the application program may begin scanning for the wireless signals of other nearby electronic devices when the authentication process is initiated by an authorized user. Initiation of the authentication process may include the opening of the application program or taking some other action with the application program.

In some embodiments, a camera on the user's personal computing device may be used to capture images of ("scan") the area near the entrance into the secure area. For example, the security application program on the user's personal computing device may prompt the authorized user to direct the field of view of the camera around the room, such as by rotating the camera 360 degrees in a horizontal plane, to capture an image of any one or more other people present in the surrounding location. The application program and/or the security system may use the captured image(s) to determine a number of people other than the authorized user that are present at the entrance. If these other people have not been authenticated as also being authorized users, then the security system will deny anyone access to the secure area. While the authorized user may have been authenticated, the presence of one or more unauthenticated causes the security system to deny access to the secured area. Optionally, the authorized user may be subsequently granted access if the unauthenticated persons leave the proximity of the entrance such that only authenticated persons remain, or if the unauthenticated persons are subsequently authenticated.

The foregoing computer program products may further include program instructions for implementing or initiating any one or more aspects of the methods described herein. Furthermore, any of the operations attributed to the program instructions may be implemented as operations of a method.

FIG. 1 is a diagram of a security system 10 for controlling physical access to a secure area 20. The security system 10 includes a security system computer 30 having connections 32 to wireless transceivers 34 located near an entrance 22 to the secure area 20 and within the secure area 20, to an entrance door lock actuator 36, and to a display screen 38. An area 24 near the entrance 22 may illustrate an area where electronic devices are close enough to the entrance 22 to be detected as a potential risk for tailgating into the secure area. Optionally, the area 24 may be a wait area with walls and its own door 26, which may serve to define a predetermined area where users and electronic devices within the area 24 may be easily and clear detected. Users and electronic devices outside the area 24 may be somewhat shielded and more easily and clearly separated from detection and consideration.

Several users and devices are illustrated as being present within the area 24 within a predetermined proximity of the entrance 22 to the secure area 20. In this illustration, a first user ("User1") 40 is present with a first personal computing device 41 in the form of a smartphone, a second user ("User2") 42 is present with a second personal computing device 43 in the form of a laptop computer, an additional electronic device 44 in the form of a tablet computer, and yet another electronic device 46 in the form of a headset or headphones. The first user 40 should initiate authentication using an application program installed on their smartphone 41 and the second user 42 should initiate authentication using an application program installed on their laptop computer 43. The first and second users 42, 44 may submit their own user data to the security system computer 30 via their respective personal computing devices 41, 43. The application programs on the personal computing devices 41, 43 may further cause the personal computing devices 41, 43 to detect other electronic devices within the area 24 and report the detected electronic devices to the security system computer 30. In this example, the personal computing devices 41, 43 may each detect the other personal computing device and the two electronic devices 44, 46. It is possible that the personal computing devices 41, 43 are each registered to authorized users that will successfully complete authentication to the security system computer 30 but is it also possible that the two electronic devices 44, 46 are unregistered. These two electronic devices 44, 46 may indicate the presence of an unauthorized person attempting to tailgate through the entrance 22 into the secure area 20. Some embodiments may display authentication status information on the display screen 38 so that those users within the area 24 may troubleshoot the conditions that may be preventing them from being granted access to the secure area 20. In this illustration, the display screen 38 might indicate that there are two authenticated users, each with their own personal computing device that is registered to them. However, the display screen 38 might further indicate that there are two electronic devices present that are unregistered. The user may then begin trying to identify the unregistered devices and either register them (if the devices belong to them) or remove them from the area 24.

Figure 2:
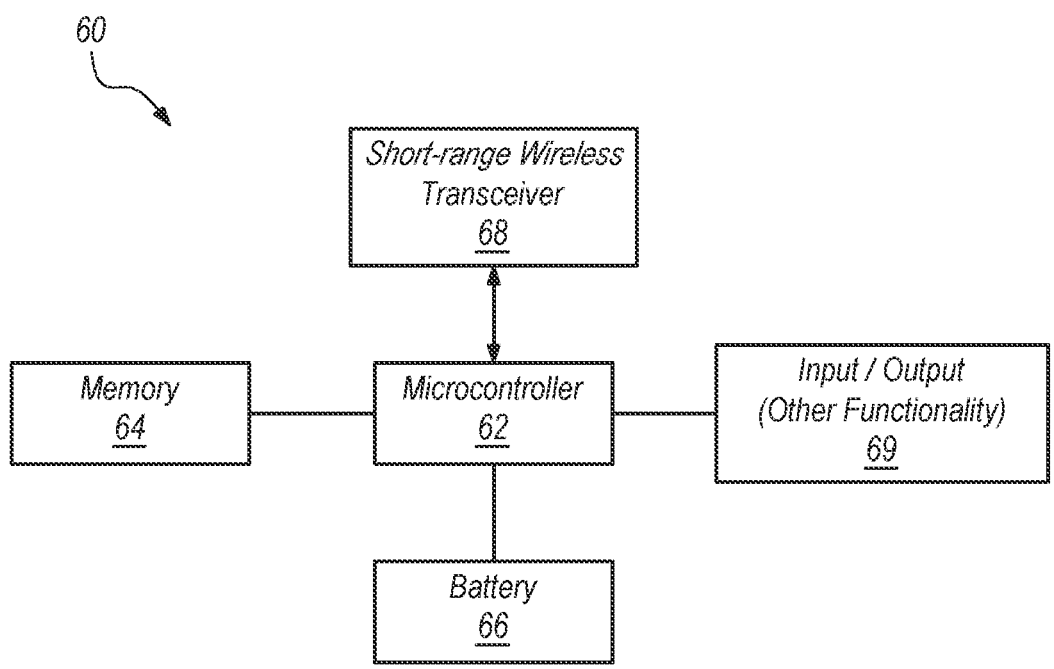
FIG. 2 is a diagram of a short-range wireless device or accessory.

FIG. 2 is a diagram of an electronic device 60, which may be representative of a short-range wireless device or accessory 46 of FIG. 1, such as a headset or headphones. The electronic device 60 may include a microcontroller 62, memory 64, a battery 66 or other power source, a short-range wireless transceiver 68, and an input/output component 69 or other functionality. The battery 66 provides power to each of the other components and may allow the electronic device 60 to be mobile. The microcontroller electronic device 60 may access the memory 64 to store or buffer data and/or applications, send and/or receive data on the short-range wireless transceiver 68, and control one or more input/output component 69. In the example where the electronic device 60 is a set of wireless headphones, the input/output component 69 may be a pair of speakers and one or more buttons or dials that receive user input to control the volume or other aspect of the wireless headphones. The electronic device 60 may also be representative of other devices, such as earbuds, speakers, smart watches, printers, keyboards, cameras, display devices, smart power outlets, smart switches and controllers, smart glasses, and the like.

Figure 3:
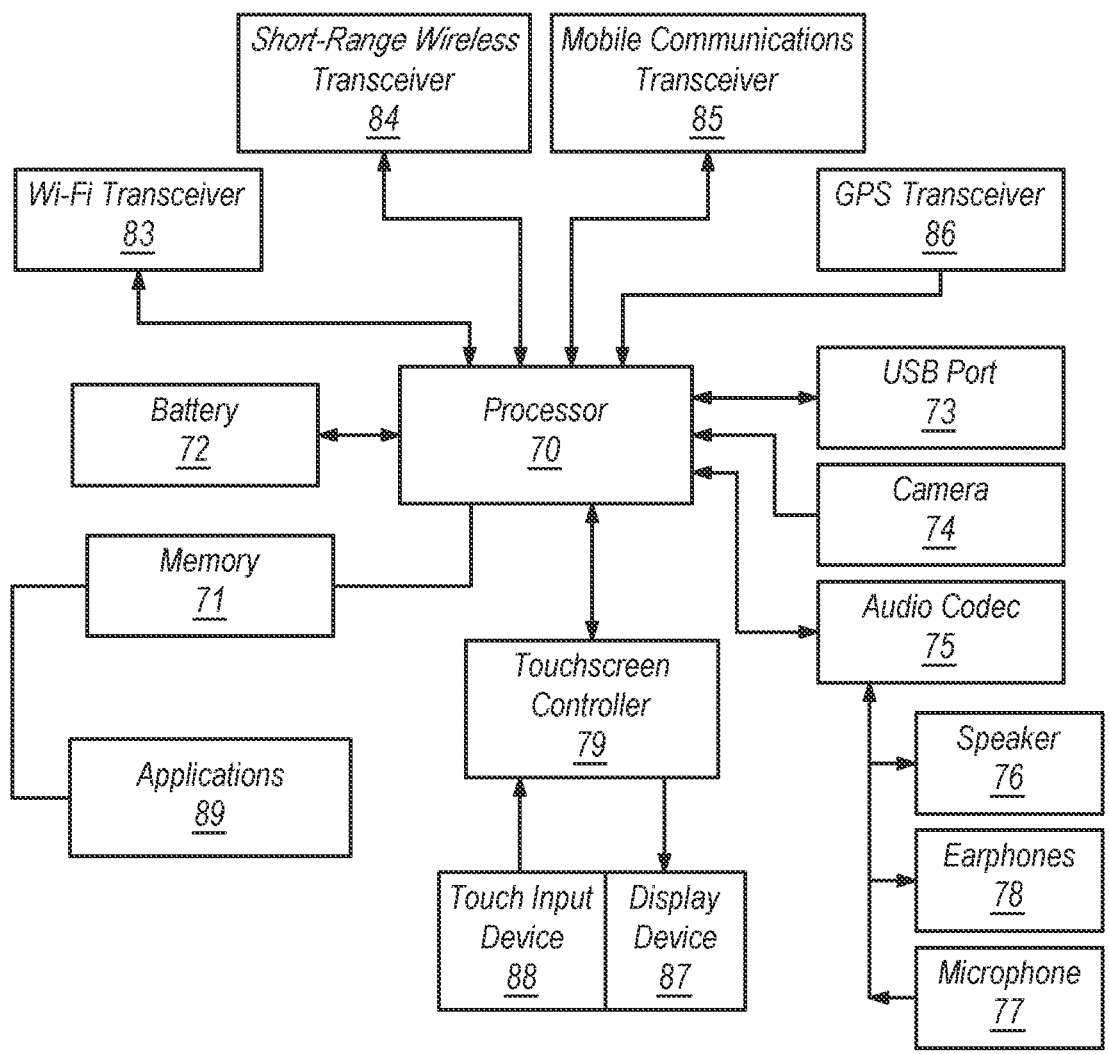
FIG. 3 is a diagram of a personal computing device, such as a smartphone.

FIG. 3 is a diagram of the mobile computing device 60, which may be representative of a personal computing device such as a smartphone 41 of FIG. 1 that may form a wireless connection with the security system computer 30 via one of the antennas 34. It should also be recognized that the diagram may also be representative of some embodiments of a registered or unregistered electronic device, such as the table computer 44 shown in FIG. 1.

The computing device 60 may include a processor 70, memory 71, a battery (or other power source) 72, a universal serial bus (USB) port 73, a camera 74, and an audio codec 75 coupled to a built-in speaker 76, a microphone 77, and an earphone jack 78. The computing device 10 may further include a touchscreen controller 79 which provides a graphical output to the display device 87 and an input from a touch input device 88. Collectively, the display device 87 and touch input device 88 may be referred to as a touchscreen.

The computing device 60 may also include a short-range wireless transceiver 84, a wireless local area network transceiver ("Wi-Fi transceiver") 83, a mobile communication transceiver 85 for communication with a cellular communication network, and a global positioning system (GPS) transceiver 86. Accordingly, the computing device 60 may use the various transceivers 83-86 to communicate with the security system computer 30, determine the current location of the device, and detect wireless signal transmissions from various types of electronic devices near the computing device (i.e., within the proximity of the entrance to the secure area).

The memory 71 may store one or more applications 89 including program instructions that are executable by the processor 70. Such applications may include a security application program ("app") as described herein.

Figure 4:
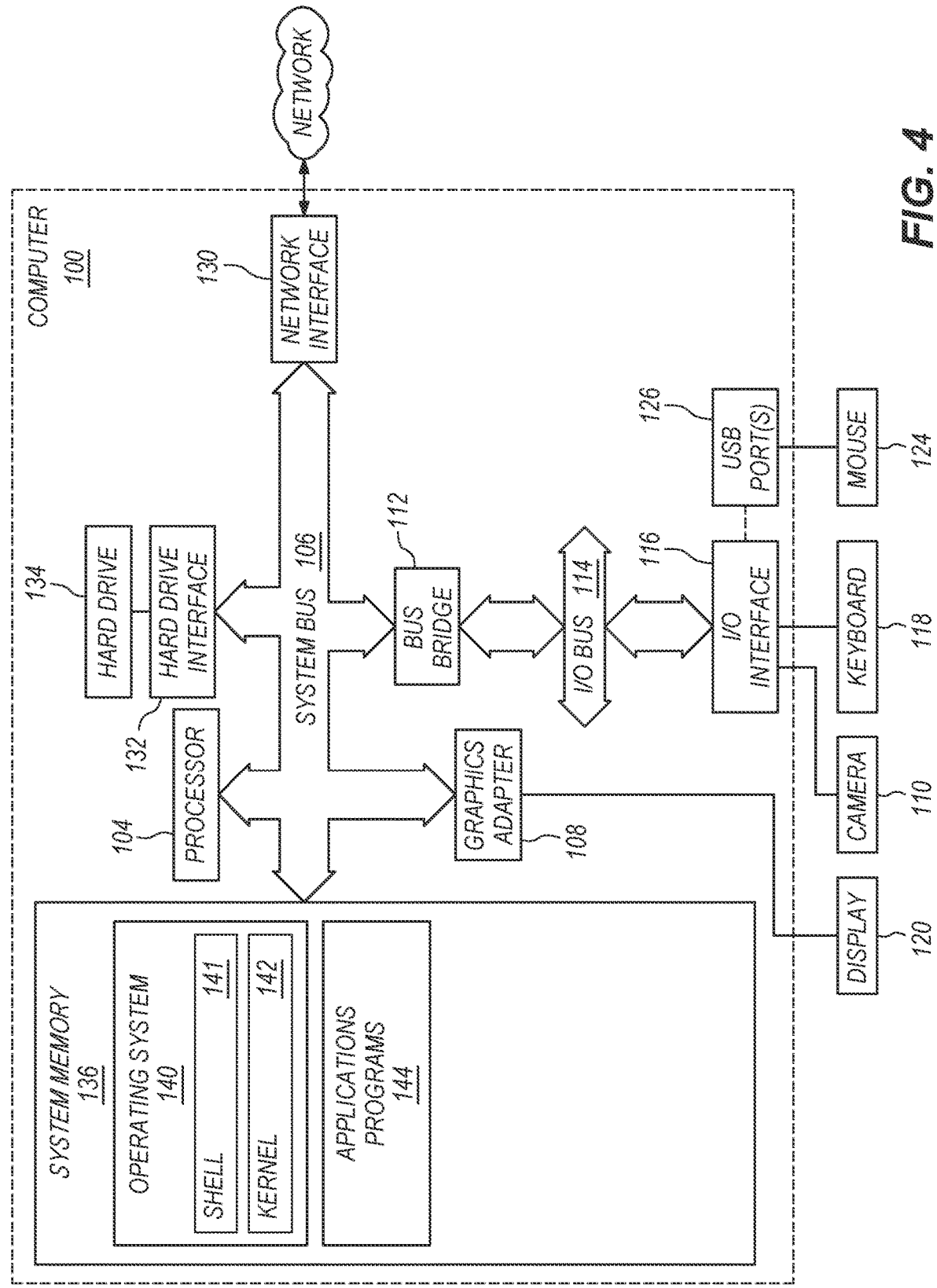
FIG. 4 is a diagram of a computer that may be representative of a personal computing device, a security system computer controlling access to the secure area, or a server within the secure area.

FIG. 4 is a diagram of a computer 100 that may be representative of a personal computing device 43, the security system computer 30 controlling access to the secure area 20, or a server in one of the racks 21 within the secure area 20 of FIG. 1. The computer 100 includes a processor unit 104 that is coupled to a system bus 106. The processor unit 104 may utilize one or more processors, each of which has one or more processor cores. An optional graphics adapter 108, which may drive/support an optional display 120, is also coupled to the system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other computers or other devices over a network using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the computer 100 are not intended to be exhaustive, but rather are representative.

The operating system 140 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136. For the example, the applications programs 144 may include one or more access control and monitoring logic where the computer is the security system computer 30 and may include the security "app" wherein the computer is a personal computing device 43.

Figure 5:
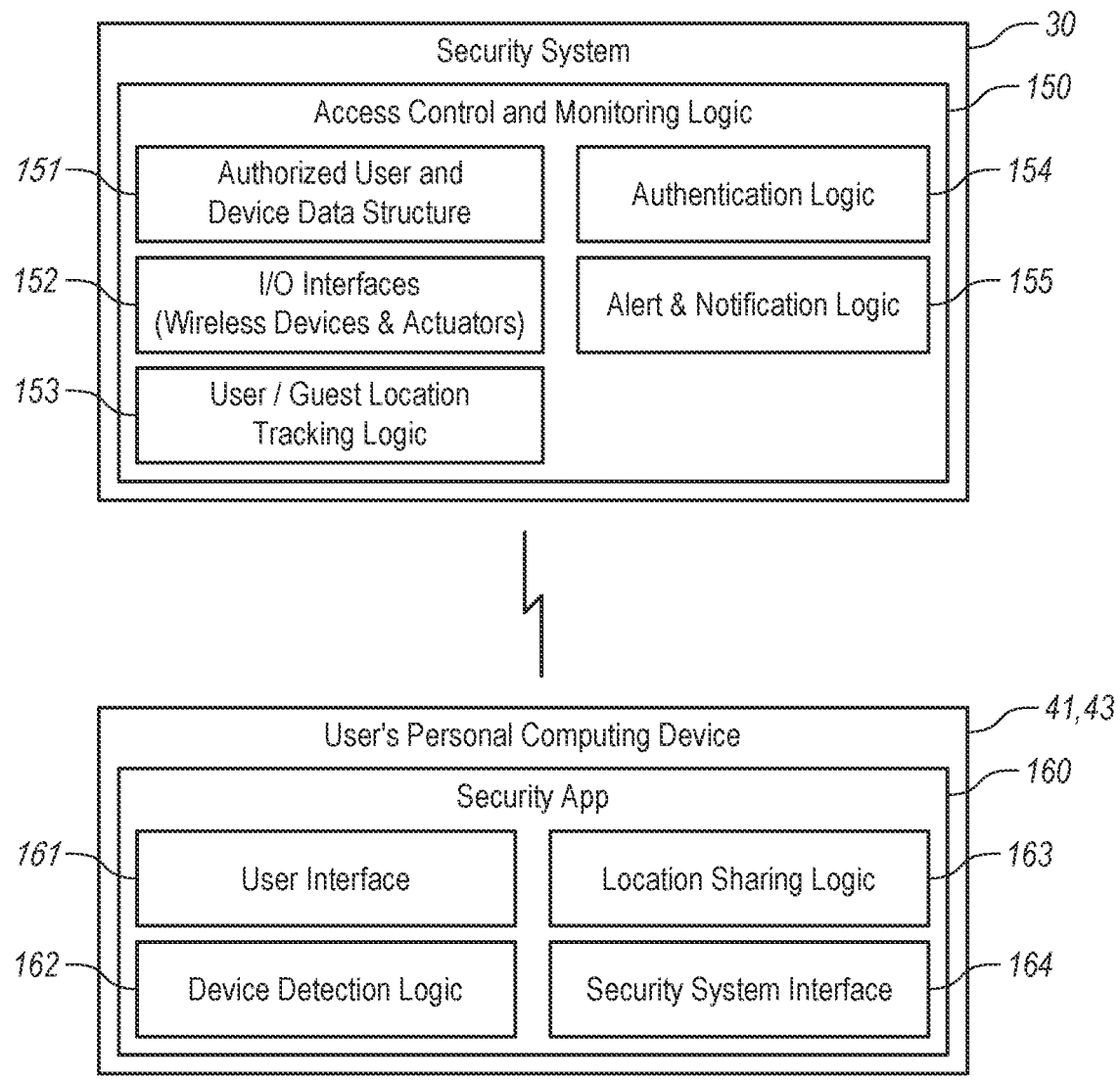
FIG. 5 is a block diagram of software logic modules that may support the operations of the security system computer and a user's personal computing device.

FIG. 5 is a block diagram of software logic modules that may support the operations of the security system computer 30 and a user's personal computing device 41, 43 of FIG. 1. The security system computer 30 performs access control and monitoring logic 150 and the user's personal computing device 41, 43 performs a security application 160. The security system computer 30 and the user's personal computing device 41, 43 communicate and interact to implement some embodiments.

The access control and monitoring logic 150 includes an authorized user and device data structure module 151, input/output interfaces for the wireless devices (WiFi and Bluetooth antennas) and lock actuator(s) module 152, user/guest location tracking logic module 153, user authentication logic module 154, and alert and notification logic module 155.

The authorized user and device data structure module 151 may control the creation and use of the user records in the authorized user and device data structure, including the registration of the user's personal computing device and other electronic devices. The input/output interfaces for the wireless devices (WiFi and Bluetooth antennas) and lock actuator(s) module 152 may facilitate input and output, such as communication with the personal computing devices, tracking the location of various devices, providing output to the display screen, controlling the actuator of the door lock at the entrance to the secure area, and controlling the keyboard, video and mouse systems of the servers within the secure area. The user/guest location tracking logic module 153 may monitor the current location of the user and guest devices as they move throughout the secure area. The user authentication logic module 154 may receive user data input received from the personal computing devices to authentication the user, including the user data and current location. The user authentication logic module 154 may also verify that the personal computing device has scanned for nearby electronic devices and submitted any data resulting from the scan. The alert and notification logic module 155 may determine whether an alert condition exist and control the response to an alert condition, such as locking down one or more servers within the secure area.

The security application 160 includes a user interface module 161, device detection logic module 162, location sharing logic module 163, and security system interface module 164. The user interface module 161 may provide various user prompts to guide the user input and provide that user input to the security system. Optionally, the user interface module 161 may also provide status information regarding the authentication process and any condition that is preventing the security system from granting access to the secure area. The device detection logic module 162 may initiate and control how the personal computing device scans for transmission signals from nearby electronic devices. For example, the device detection logic module 162 may make use of a WiFi transceiver and/or short-range wireless transceiver to detect signals at various times during the authentication process. The location sharing logic module 163 may obtain the current location of the personal computing device and provide that information to the security system for determining that the device is in the predetermined area near the entrance and/or tracking within the secure area. The security system interface module 164 may coordinate input and output with the security system computer. These and other modules may be envisioned to implement various embodiments.

Figure 6:
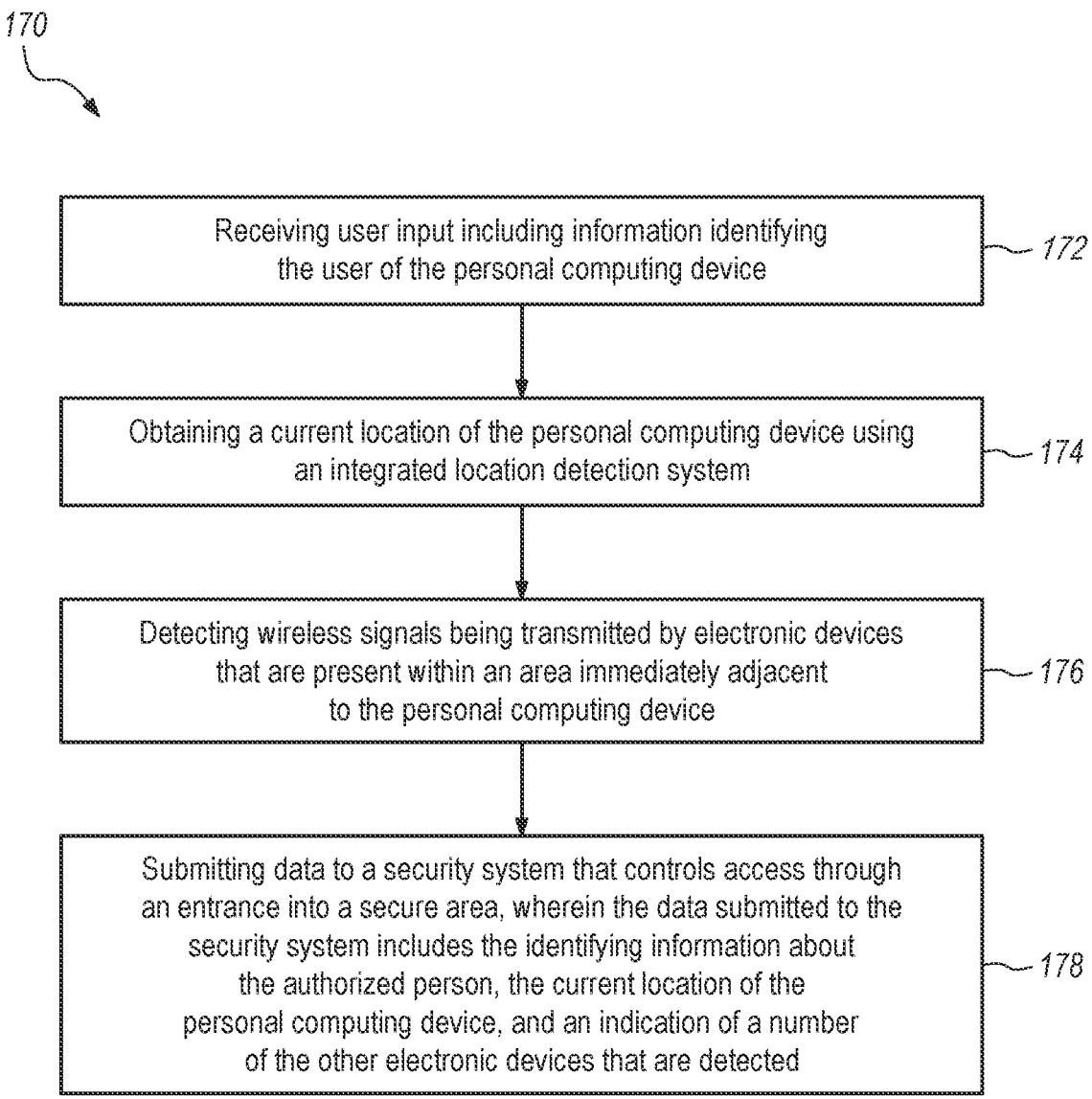
FIG. 6 is a flowchart of operations performed by a personal computing device.

FIG. 6 is a flowchart of operations 170 performed by a personal computing device. Operation 172 includes receiving user input including information identifying the user of the personal computing device. Operation 174 includes obtaining a current location of the personal computing device using an integrated location detection system. Operation 176 includes detecting wireless signals being transmitted by electronic devices that are present within an area immediately adjacent to the personal computing device. Operation 178 includes submitting data to a security system that controls access through an entrance into a secure area, wherein the data submitted to the security system includes the identifying information about the authorized person, the current location of the personal computing device, and an indication of a number of the other electronic devices that are detected.

Figure 7:
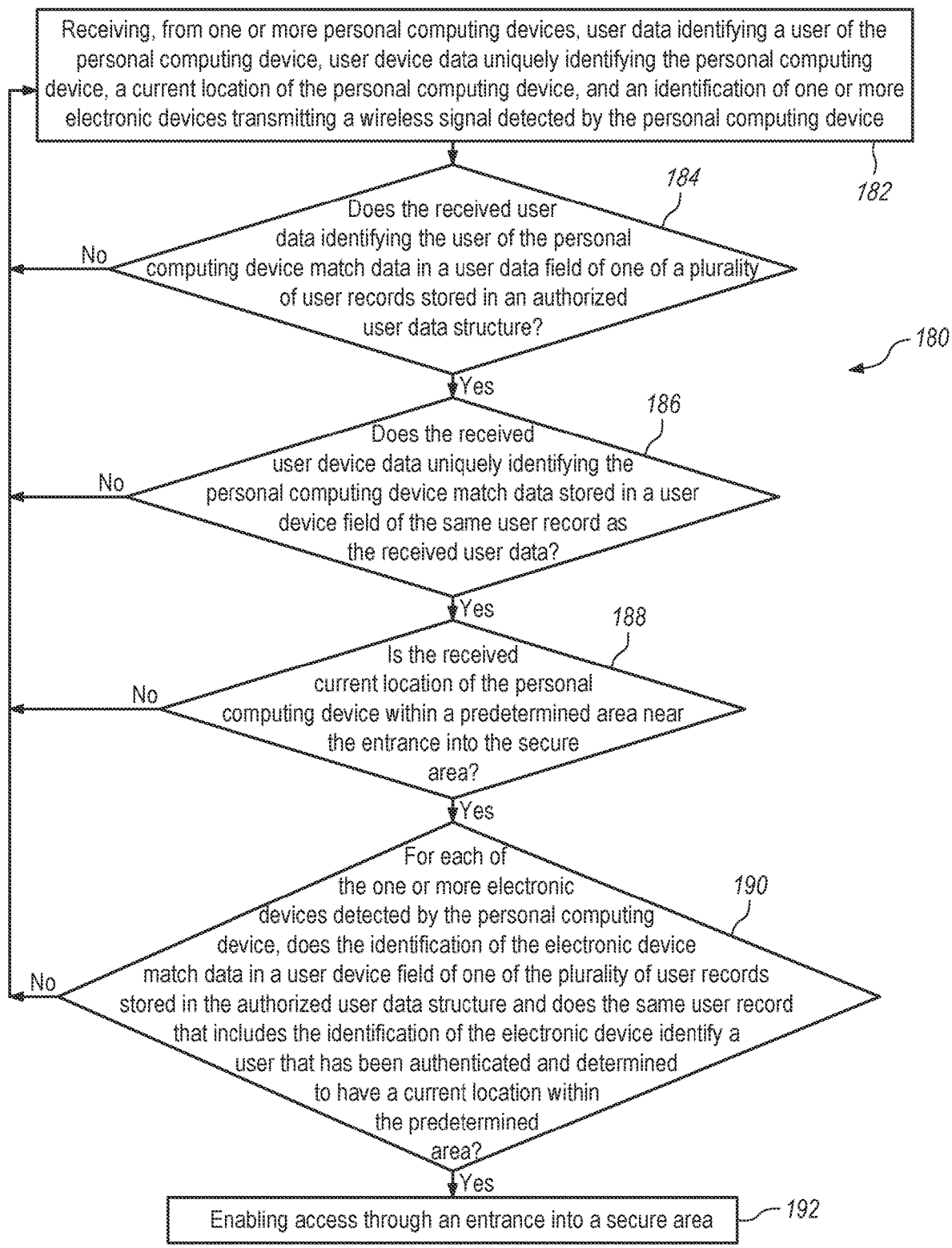
FIG. 7 is a flowchart of operations performed by a security system computer.

FIG. 7 is a flowchart of operations 180 performed by a security system computer. Operation 182 includes receiving, from one or more personal computing devices, user data identifying a user of the personal computing device, user device data uniquely identifying the personal computing device, a current location of the personal computing device, and an identification of one or more electronic devices transmitting a wireless signal detected by the personal computing device. The next operations 184, 186, 188, 190 have been referred to herein as a set of conditions that must each be satisfied in order to enable access to the secure area in operation 192. The set of conditions may be determined in any order, but each condition (in the manner stated) must be answered in the affirmative in order to perform operation 192.

Operation 184 includes determining whether the received user data identifying the user of the personal computing device matches data in a user data field of one of a plurality of user records stored in an authorized user data structure. Operation 186 includes determining whether the received user device data uniquely identifying the personal computing device matches data stored in a user device field of the same user record as the received user data. Operation 188 includes determining whether the received current location of the personal computing device is within a predetermined area near the entrance into the secure area. Operation 190 includes determining whether, for each of the one or more electronic devices detected by the personal computing device, the identification of the electronic device matches data in a user device field of one of the plurality of user records stored in the authorized user data structure and whether the same user record that includes the identification of the electronic device identifies a user that has been authenticated and determined to have a current location within the predetermined area.

If each of the operations 184, 186, 188, 190 reach an affirmative determination (i.e., the conditions are satisfied) then operation 192 enables access through an entrance into a secure area. If any of the operations 184, 186, 188, 190 reach a negative determination, the process returns to operation 182 to receive more data or updated data and then retest the conditions in operations 184, 186, 188, 190.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions, when executed by a processor, cause the processor to perform operations comprising:
   receiving, from one or more personal computing devices, user data identifying a user of the personal computing device, user device data uniquely identifying the personal computing device, a current location of the personal computing device, and an identification of one or more electronic devices transmitting a wireless signal detected by the personal computing device; and
   enabling access through an entrance into a secure area in response to determining that, for each of the one or more personal computing devices, a set of conditions are satisfied, the set of conditions including:
      the received user data identifying the user of the personal computing device matches data in a user data field of one of a plurality of user records stored in an authorized user data structure;
      the received user device data uniquely identifying the personal computing device matches data stored in a user device field of the same user record as the received user data;
      the received current location of the personal computing device is within a predetermined area near the entrance into the secure area; and
      for each of the one or more electronic devices detected by the personal computing device, the identification of the electronic device matches data in a user device field of one of the plurality of user records stored in the authorized user data structure and the same user record that includes the identification of the electronic device identifies a user that has been authenticated and determined to have a current location within the predetermined area.

2. The computer program product of claim 1, wherein the user data identifying the user of the personal computing device includes a personal name, security system username and/or password, badge number or radio frequency identification code, password, and/or biometric data.

3. The computer program product of claim 1, wherein the personal computing device is a mobile computing device and the user data, user device data, current location and identification of one or more electronic devices is received in a wireless communication.

4. The computer program product of claim 3, wherein the wireless communication uses a cellular communication protocol, a wireless network communication protocol, a short-range communication protocol, or a near-field communication protocol.

5. The computer program product of claim 1, wherein the user device data uniquely identifying the personal computing device includes a media access control address.

6. The computer program product of claim 1, wherein the current location of the personal computing device includes global positioning system coordinates.

7. The computer program product of claim 1, wherein the identification of each of the one or more electronic devices includes a media access control address.

8. The computer program product of claim 1, further comprising:
sending output to the personal computing device prompting the user of the personal computing device to enter one or more types of the user data identifying the user.

9. The computer program product of claim 1, the operations further comprising:
sending output to the personal computing device prompting the user to direct a camera of the personal computing device to capture images of the predetermined area near the entrance into the secure area;
receiving the captured images from the personal computing device; and
analyzing the captured images to determine a number of people that are currently present in the predetermined area near the entrance into the secure area, wherein the set of conditions further includes the number of people currently present in the predetermined area is equal to the number of people that have been authenticated and determined to have a current location within the predetermined area.

10. The computer program product of claim 1, wherein the set of conditions further includes the user record in the authorized user data structure associated with the user of the personal computing device having a security level field indicating that the user has privilege to access the secure area.

11. The computer program product of claim 1, the operations further comprising:
registering a person as an authorized user with privilege to access a secure area by creating a user record in the authorized user data structure with user data identifying the person and user device data identify a personal computing device belonging to the person.

12. The computer program product of claim 1, the operations further comprising:
obtaining a current location of each user within the secure area;
determining whether each user has privilege to access a particular server within the secure area; and
enabling keyboard, mouse, and/or video access to the particular server in response to determining that each user having a current location that is within a predetermined proximity of the particular server user has privilege to access the particular server.

13. The computer program product of claim 12, the operations further comprising:
disabling the keyboard, mouse and/or video access to the particular server in response to determining that there is no user that is within a predetermined proximity of the particular server having privilege to access the particular server.

14. The computer program product of claim 12, the operations further comprising:
disabling the keyboard, mouse and/or video access to any server within a predetermined proximity of the user in response to determining that the user does not have privilege to access the particular server.

15. The computer program product of claim 1, the operations further comprising:
receiving, from one or more of the personal computing devices, an updated identification of one or more electronic devices transmitting a wireless signal detected by the personal computing device.

16. The computer program product of claim 1, the operations further comprising:
recognizing a specific wireless trackable device as a guest pass to be carried by a guest to enable the guest to gain access through the entrance into the secure area, wherein the presence of the guest and wireless trackable device in the predetermined area near the entrance are disregarded when determining that, for each of the one or more personal computing devices, the set of conditions are satisfied.

17. The computer program product of claim 16, the operations further comprising:
tracking a current location of the specific wireless trackable device within the secure area until the specific wireless trackable device is no longer within the secure area, wherein the current location of the guest is determined using an array of personal area network signal receivers and/or local area network signal receivers within the secure area to identify the current location of the wireless trackable device; and
generating an alert in response to the specific wireless trackable device entering a restricted area within the secure area.

18. The computer program product of claim 1, the operations further comprising:
tracking the path of each personal computing device and each electronic device within the secure area, wherein the current location of each personal computing device is received from the personal computing device until the personal computing device is no longer within the secure area, wherein the personal computing device determines its current location by receiving signals from a Global Positioning System or an indoor location tracking/positioning system;
identifying, for each personal computing device and each electronic device within the secure area, a user record associated the respective device and a security level associated with the user identified in the user record; and
generating an alert in response to determining, for any personal computing device or any electronic device, that the respective device is currently located within a restricted area within the secure area and the user record associated with the respective device identifies the user to have a security level that is not associated with privilege to access the restricted area.

19. The computer program product of claim 1, the operations further comprising:
monitoring wireless signal transmissions within the secure area; and
generating an alert in response to detecting a wireless signal transmission within the secure area that is not associated with any user device in the authorized user data structure.

20. A computer program product comprising a non-transitory computer readable medium and program instructions embodied therein, the program instructions, when executed by a processor, cause the processor to perform operations comprising:
- receiving user input including information identifying the user of the personal computing device;
- obtaining a current location of the personal computing device using an integrated location detection system;
- detecting wireless signals being transmitted by electronic devices that are present within an area immediately adjacent to the personal computing device; and
- submitting data to a security system that controls access through an entrance into a secure area, wherein the data submitted to the security system includes the identifying information about the authorized person, the current location of the personal computing device, and an indication of a number of the other electronic devices that are detected.

* * * * *